US012599969B2

(12) United States Patent
Binek et al.

(10) Patent No.: US 12,599,969 B2
(45) Date of Patent: Apr. 14, 2026

(54) POWDER BED FUSION BUILD PLATE THERMAL HISTORY INDICATOR

(71) Applicant: RTX Corporation, Farmington, CT (US)

(72) Inventors: Lawrence A. Binek, Glastonbury, CT (US); Joseph E. Ott, Enfield, CT (US); Benjamin G. Gardell, Bristol, CT (US); Dean R. Sirois, Enfield, CT (US); Alexandru Cadar, Eastford, CT (US); Jesse R. Boyer, Middletown, CT (US); Michael Walter Bennett, East Hartford, AL (US)

(73) Assignee: RTX Corporation, Farmington, CT (US)

( * ) Notice: Subject to any disclaimer, the term of this patent is extended or adjusted under 35 U.S.C. 154(b) by 458 days.

(21) Appl. No.: 18/453,084

(22) Filed: Aug. 21, 2023

(65) Prior Publication Data

US 2025/0065413 A1 Feb. 27, 2025

(51) Int. Cl.
| | |
|---|---|
| B22F 12/30 | (2021.01) |
| B22F 10/28 | (2021.01) |
| B22F 12/90 | (2021.01) |
| B33Y 10/00 | (2015.01) |

(Continued)

(52) U.S. Cl.
CPC .............. B22F 12/30 (2021.01); B22F 10/28 (2021.01); B22F 12/90 (2021.01); B33Y 10/00 (2014.12); B33Y 30/00 (2014.12); B33Y 50/00 (2014.12); B22F 2203/11 (2013.01)

(58) Field of Classification Search
CPC .......... B22F 12/30; B22F 10/28; B22F 12/90;
B22F 2203/11; B22F 10/64; B33Y 10/00;
B33Y 30/00; B33Y 50/00; B33Y 50/02;
B33Y 40/20; Y02P 10/25; G01K 3/04;
G01K 5/52; G01K 5/54; G01K 7/02;
G01K 11/12
See application file for complete search history.

(56) References Cited

FOREIGN PATENT DOCUMENTS

| | | |
|---|---|---|
| CN | 207643706 U | 7/2018 |
| CN | 112693120 B | 5/2022 |
| WO | 2019078870 A1 | 4/2019 |

(Continued)

OTHER PUBLICATIONS

Zhao et al.; "Stretchable electrochromic devices enabled via shape memory alloy composites (SMAC) for dynamic camouflage", Optical Materials 94, 2019, pp. 378-386 (Year: 2019).*

(Continued)

*Primary Examiner* — Adil A. Siddiqui
(74) *Attorney, Agent, or Firm* — Kinney & Lange, P.A.

(57) ABSTRACT

A powder bed fusion (PBF) additive manufacturing (AM) machine includes a build plate configured to function as a platform to support one or more parts built using the PBF AM machine. The build plate further includes a thermal history indicator positioned on the build plate, attached to the build plate, or physically integrated with the build plate such that the thermal history indicator experiences the same temperature as the build plate. The thermal history indicator is configured to display a durable visual indication of achievement of a temperature associated with a post-processing step performed after the one or more parts are built on the build platform.

20 Claims, 4 Drawing Sheets

(51) Int. Cl.
    *B33Y 30/00*         (2015.01)
    *B33Y 50/00*         (2015.01)

(56)              References Cited

FOREIGN PATENT DOCUMENTS

WO         2019186603 A1   10/2019
WO    WO-2023043434 A1 *  3/2023   ............. B33Y 50/02

OTHER PUBLICATIONS

Oguntosin; "Design of a color changing shape memory actuator"; Science Talks 5, 2023, pp. 1-5 (Year: 2023).*
Shane; "Shape Memory Alloys: Do You Really Know Them?"; webpage; Aug. 18, 2023, pp. 1-24) (Year: 2023).*
By Shane, "Shape Memory Alloys: Do You Really Know Them?," Jul. 28, 2023, Copyright © 2023 MachineMfg, pp. 2.
Victoria Oguntosin, "Design of a color changing shape memory actuator," Science Direct, Science Talks 5 (2023) 100148.
Extended European Search Report for European Patent Application No. 24195145.8, dated Feb. 3, 2025, 9 pages.

* cited by examiner

POWDER BED FUSION BUILD PLATE THERMAL HISTORY INDICATOR

BACKGROUND

The present disclosure relates generally to powder bed fusion additive machines and, more particularly, to a powder bed fusion build plate thermal history indicator for a powder bed fusion additive machine.

Powder bed fusion (PBF) additive manufacturing is an additive manufacturing, or 3-D printing, technology that uses an energy source, such as a laser (PBF-LB) or electron beam (PBF-EB), to sinter or fuse metallic or polymeric particles together in a layer-by-layer process. PBF is typically used as an industrial process to make near net shape parts. Some PBF processes sinter the build powder particles, while others melt and fuse the build powder particles. PBF-LB is also known as direct metal laser sintering (DMLS).

Stress relief is an important post-processing step in PBF additive manufacturing to relieve residual internal thermal stresses that build up in parts during the manufacturing process. Inaccurate or incomplete stress relief cycles may not fully resolve residual internal thermal stresses or cause the part to crack or continue cracking. If the residual internal stresses from the PBF additive manufacturing processes are not managed, the part may suffer from distortion during part removal from the build plate (e.g., using wire EDM) or cause wire-breakage during the process step. Unintended cracking can lead to the part being scrapped, which is a source of waste and excess cost and typically requires another build iteration to replace the scrapped part.

SUMMARY

One aspect of this disclosure is directed to a powder bed fusion (PBF) additive manufacturing (AM) machine that includes a build plate configured to function as a platform to support one or more parts built using the PBF AM machine. The build plate further includes a thermal history indicator positioned on the build plate, attached to the build plate, or physically integrated with the build plate such that the thermal history indicator experiences the same temperature as the build plate. The thermal history indicator is configured to display a durable visual indication of achievement of a temperature associated with a post-processing step performed after the one or more parts are built on the build platform.

Another aspect of the disclosure is directed to a method of operating a powder bed fusion (PBF) additive manufacturing (AM) machine includes providing a build plate configured to function as a platform to support one or more parts built using the AM machine and exposing the build plate and a thermal history indicator positioned on the build plate, attached to the build plate, or physically integrated with the build plate to elevated temperatures associated with a post-processing step performed after the one or more parts are built on the build platform. The thermal history indicator displays a durable visual indication of achievement of a predetermined temperature associated with the post-processing step.

DETAILED DESCRIPTION

Laser powder bed fusion (PBF-LB) additive manufacturing (AM) and the similar electron beam powder bed fusion (PBF-EB) AM process are options to make near net shape parts. Stress relief is an important post-processing step in PBF additive manufacturing to relieve residual internal thermal stresses that build up in parts during the manufacturing process. Inaccurate or incomplete stress relief cycles may not fully resolve residual internal thermal stresses or cause the part to crack or continue cracking. If the residual internal stresses from the PBF additive manufacturing processes are not managed, the part may suffer from distortion during part removal from the build plate (e.g., using wire EDM) or cause wire-breakage during the process step. Unintended cracking can lead to the part being scrapped, which is a source of waste and excess cost and typically requires another build iteration to replace the scrapped part.

The present disclosure is directed to a thermal history indicator that is connected to, positioned on, or inserted into a PBF build plate such that the thermal history indicator is subjected to the same temperature cycles as the PBF build plate and parts built on the PBF build plate. The objective of the thermal history indicator is to provide a durable visible indication of the temperatures to which the build plate, and the parts on the build plate, are subjected during the PBF AM process and the post-processing thermal operations, including stress relief and other operations.

Figure 1:
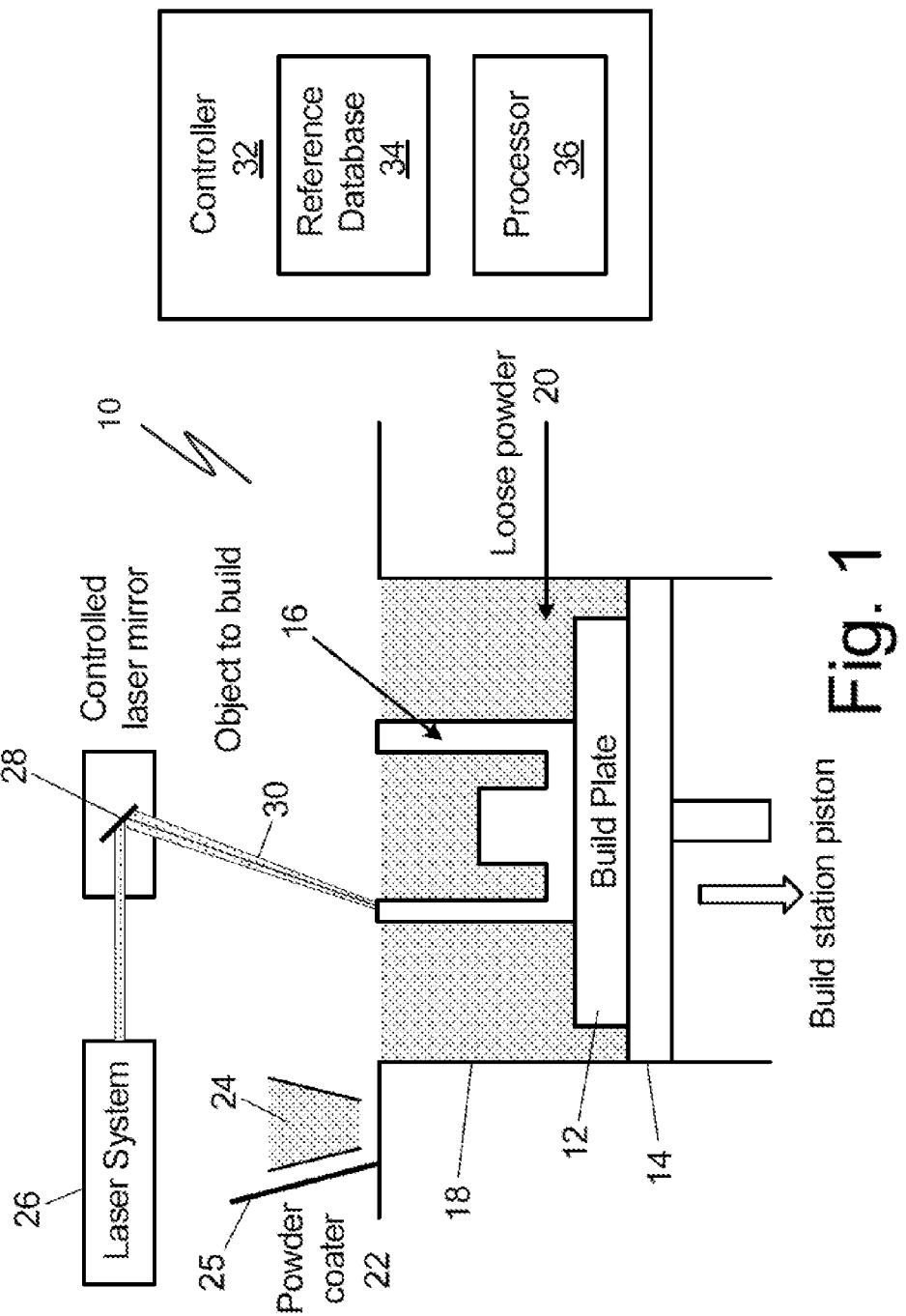
FIG. 1 is a schematic of an exemplary laser powder bed fusion (PBF-LB) additive manufacturing system.

FIG. 1 is a schematic of an exemplary, non-limiting PBF-LB system 10. While this disclosure is applicable to all PBF systems, including PBF-LB and PBF-EB systems, the exemplary, non-limiting PBF-LB system 10 is used to describe the system and method of the disclosure. A typical PBF-LB system 10 includes a build plate 12, a build station piston 14 that adjusts the height of the build plate 12, a part or part 16 that is built on top of the build plate 12, a powder chamber 18 to contain loose, and unconsolidated build powder 20 that surrounds the part 16. A typical PBF-LB system 10 also includes a powder coater 22 that distributes additional build powder 24 over the part 16 after completion of each layer formed on the part 16. A recoater blade 25 follows the powder coater 22 as it distributes additional build powder 24 to create an even layer of consolidated built powder 20. The recoater blade 25 can be made from silicone, polyurethane, rubber, or other elastomeric materials. A laser system 26 combined with a controlled laser mirror 28 directs a laser beam 30 onto loose build powder 20 to form a melt pool (not shown) that, when solidified, forms a layer of the part 16. As each layer of the part 16 is formed, the build station piston 14 lowers the built plate 12 and part 16 by a predetermined distance that corresponds to the desired thickness of the next layer of the part 16. The powder coater 22 then moves across the top of the loose build powder 20 to distribute a layer of additional build powder 24 that will then be consolidated with the laser beam 30 to form the next layer of the part 16.

Controller 32 controls the height of the build plate 12 by moving the build station piston 14, which in turn controls the thickness of each layer of the part 16. Controller 32 also controls the movement of the powder coater 22 as it distributes additional build powder 24 and the movement of the laser beam 30 as it forms the melt pool that consolidates loose build powder 20 to form each layer of the part 16. For example, the controller 32 controls PBF-LB system 10 operating parameters, including:

(1) laser beam power, laser beam velocity, and laser beam spot size, build plate temperature, and layer thickness;

(2) temperature-dependent thermophysical properties of the powder;

(3) feedstock properties including average powder particle size; and (4) laser hatching strategy including hatch distance, hatch delay time, and stripe width.

Controller 32 typically includes a reference database 34 and processor 36. Reference database 34 contains processing data relevant to the PBF-LB system 10, build powder to be used to produce the part 16, and the specific work piece 16 to be produced. Processor 36 contains programming to interface with the reference database 34 to control the PBF-LB system 10 to products parts, such as part 16, as is known to a person of ordinary skill in the art. Part 16 can be a near-net-shaped part (i.e., initial production of the part that is very close to the final (net) shape).

The PBF-LB system 10 can be used with a variety of build powders to produce part 24. For example the powder can be a metal powder or polymeric powder. Metallic powders compatible with typical PBF-LB systems 10 include aluminum, aluminum alloys (e.g., aluminum-lithium alloys), titanium, nickel, nickel alloys, and other metals and alloys known in the art. Polymeric powders compatible with typical PBF-LB systems 10 include a wide variety of polymers as known in the art.

Figure 2:
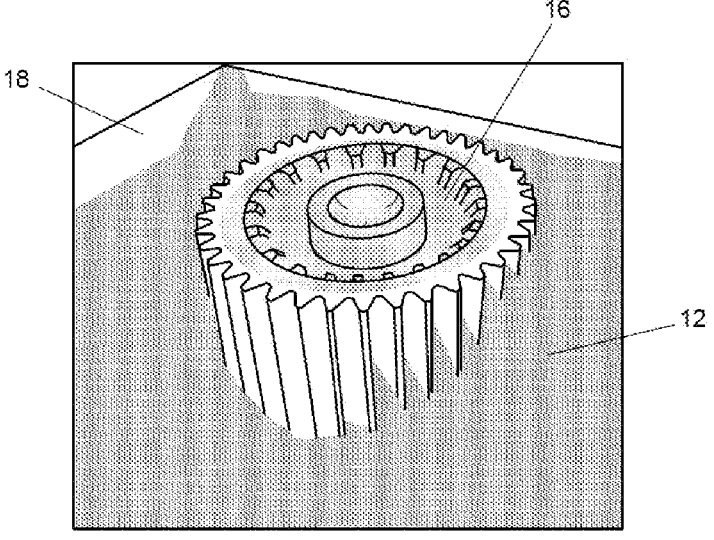
FIG. 2 is a sketch of a part made on a PBF-LB system.

FIG. 2 is a sketch of a part 16 made on PBF-LB system 10. FIG. 2 also shows powder chamber 18 that contains loose and unconsolidated build powder 20 remaining after the build operation used to make part 16. The present disclosure is directed to a powder bed fusion build plate 12 thermal history indicator for a PBF AM machine that can be used to track the thermal history of the part 16 as is proceeds through the AM process followed by stress relief and any other post AM process thermal processing.

Figure 3:
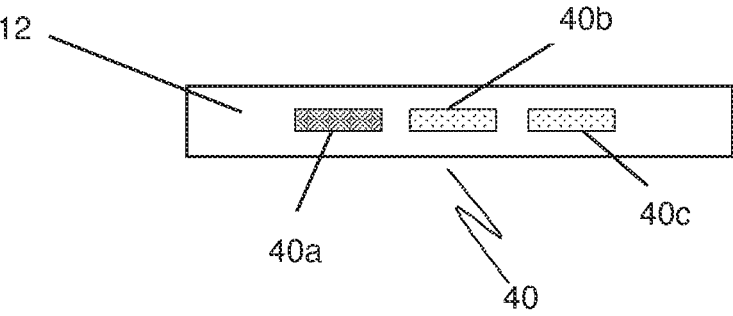
FIG. 3 is a view of three thermal history indicators positioned on a PBF-LB system build plate.

FIG. 3 shows build plate 12 that includes a durable thermal history indicator 40 that is constructed to display a durable visual indication of temperatures that the build plate 12 and parts 16 on it experienced during post AM thermal processing. Such post AM thermal processing can include, but is not limited to, stress relief (SR), hot isostatic pressing (HIP), and heat treatment (HT). The thermal history indicator 40 is a device that is connected to, positioned on, or inserted into the build plate 12 (e.g., positioned on the build plate 12, attached to the build plate 12, or physically integrated with the build plate 12) such that the thermal history indicator 40 is subjected to the same temperature cycles as the build plate 12 and the parts 16 built on the build plate 12. Each thermal history indicator 40 has a predetermined calibrated temperature limit and is configured to provide a durable visual indication when the predetermined temperature limit is achieved. In this context, "durable" means that the visual indication persists after the temperature of the build plate 12 and parts 16 are reduced below the predetermined calibrated temperature limit. This capability functions as an additional and redundant indicator of the temperature achieved during post AM thermal processing that is decoupled from the controls and recording devices associated with a stress relief furnace or other AM post-processing device (not shown).

In the example shown in FIG. 3, the durable thermal history indicator 40 is a plurality of thermocouples, each of which is associated with a visual indicator. Each of the plurality of thermocouples is calibrated to a specific temperature, which once attained, causes a current to induce a durable visible change in its associated visual indicator, for example a color change. The durable visible change in the visual indicator allows the operator to see that the build plate 12 has been subjected to specific calibrated temperatures. Each of the plurality of thermocouples can be any conventional thermocouple that generates an appropriate current to result in an irreversible color change in its associated visual indicator and is useful in the range of temperatures to which it will be exposed. For example, the thermocouple can be a chromel-aluminel (type K), platinum/rhodium (types R, S, or B), tungsten/rhenium (types G, C, or D), tantalum, molybdenum, Inconel 600, type RT or any other suitable thermocouple. The visual indicator can be made from a thermochromic material or other material that will undergo an irreversible color change after being exposed to a preselected courant from the thermocouple. Another option is for the thermal history indicator 40 to be made from a shape memory alloy that goes through an irreversible color change upon reaching a predetermined temperature. For example, a copper-nickel-aluminum alloy with color memory effects (e.g., with color changes from red to golden in varying temperatures) has recently been developed and may be useful for the application of this disclosure.

FIG. 3 shows three differently calibrated thermal history indicators 40 that can indicate whether a progression of temperatures associated with post-processing operations have been achieved, for example, one to show a temperature achieved during a stress relief process 40a, another to show a temperature achieved during a hot isostatic pressing process 40b, and a third to show a temperature achieved during a heat treatment process 40c. As can be appreciated, any number of such calibrated thermal history indicators 40 can be used in a particular application. For example, a build plate 12 may include one, two, three, or more thermal history indicators 40.

Figures 4A, 4B:
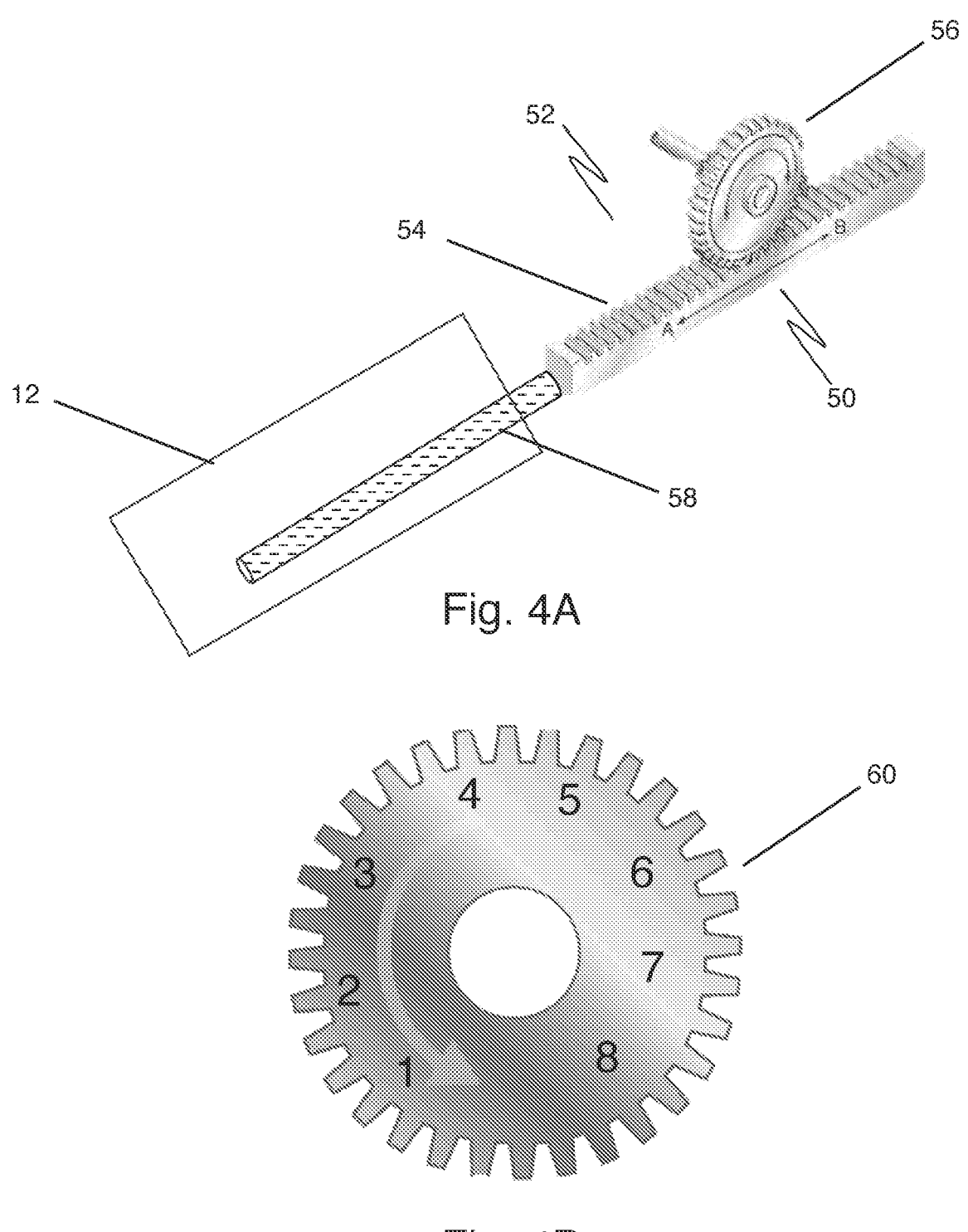
FIG. 4A is a view of a thermal history indicator based on a rack and pinion system.
FIG. 4B is dial face indicator for a rack and pinion system of FIG. 4A.

FIG. 4A shows an alternate approach to fabricating a thermal history indicator 50. In the example of FIG. 4A, thermally stable rack and pinion 52, having a rack 54 and pinion 56, acts as a mechanical counter for thermal exposure. In this context, "thermally stable" means that the rack and pinion 52 will maintain the relative relationship between the gears on the rack 54 and gears on the pinion 56 over the range of temperatures to which the rack and pinion 52 will be exposed during a PBF AM process and related post-processing operations. The "thermally stable" process can be achieved by making the rack 54 and pinion 56 from materials having the same coefficient of thermal expansion. A thermal growth material 58, which has a coefficient of thermal expansion higher than the rack 54 and pinion 56, is attached to the build plate 12 and is positioned to contact the pinion 56 as the thermal growth material 58 changes length as the build plate 12 is exposed to thermal cycles related to AM production, SR, HIP, and HT. The differential growth of the thermal growth material 58 compared to the rack 54 provides a force to move the rack 54, which in turn causes the pinion 56 to rotate. The pinion 56 includes a dial face 60, shown in FIG. 4B, that includes numerals (e.g., 1, 2, 3, 4, 5, 6, 7, and 8) or other markings to indicate progression from one thermal cycle (e.g., related to AM production, SR, HIP, and HT, etc.) to another. As the build plate 12 cools, the thermal growth material 58 recedes, removing the force on the rack 54 and maintaining the pinion 56 in its indicated position. Although thermal growth material 58 is depicted as a linear structure, it could also be configured as a spring (e.g., a linear spring, a coil spring, or any other spring configuration). Depending on spring configuration, thermal growth material 58 configured as a spring can translate rotational/linear motion to an indicator, such as dial face 60.

In another example, the rack and pinion 52 of the thermal history indicator 50 can have a variable ratio rack 54 to account for nonlinear coefficients of thermal expansion in the thermal history indicator 50 that can occur over expected temperature ranges. In yet another example, the markings on the dial face 60 can be positioned nonuniformly to account for nonlinear coefficients of thermal expansion in the thermal history indicator 50, including in one or more of the rack 54, pinion 56, and thermal growth material 58.

Figure 5:
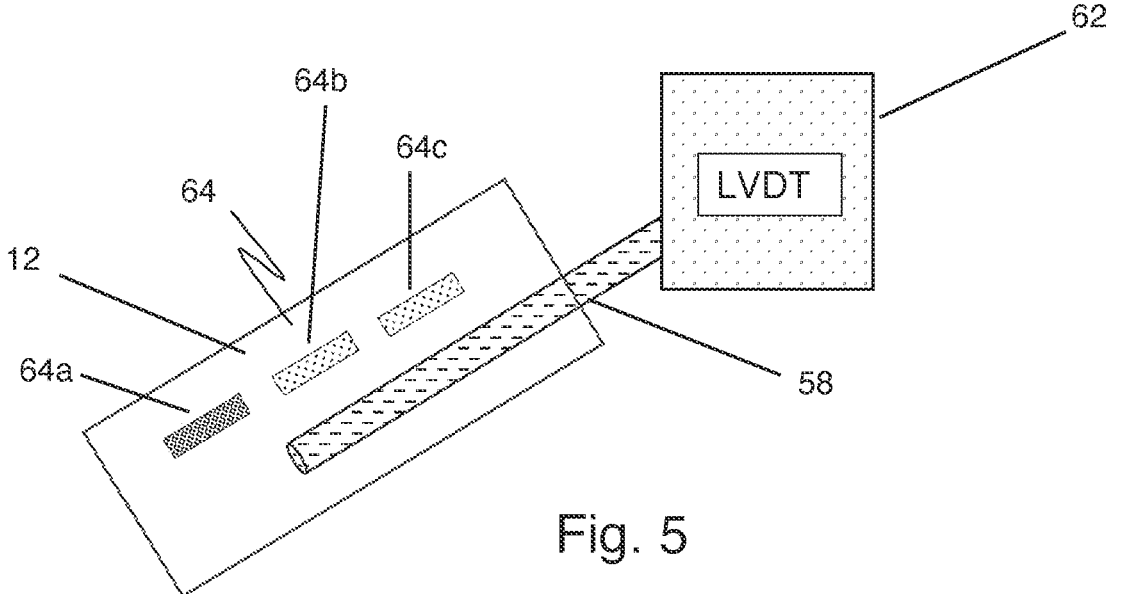
FIG. 5 is a view of a thermal history indication based on a linear variable differential transformer (LVDT).

FIG. 5 shows another example of a thermal history indicator 64. In this example, A thermal growth material 58 is attached to the build plate 12 and is positioned to contact a linear variable differential transformer (LVDT) 62 as the thermal growth material 58 changes length as the build plate 12 is exposed to thermal cycles related to AM production, SR, HIP, and HT. The growth of the thermal growth material 58 induces the LVDT 62 to generate a current that cause one or more thermal history indicators 64 to change color to show a temperature achieved during a stress relief process 64*a*, another to show a temperature achieved during a hot isostatic pressing process 64*b*, and a third to show a temperature achieved during a heat treatment process 64*c*.

The disclosed PBF build plate 12 thermal history indicator 40, 50, 64 provides a durable in-process assessment of the thermal history of the PBF build plate 12 and parts 16 built on it. The thermal history indicator 40, 50, 64 is positioned on or inserted into the build plate and has a preselected, calibrated temperature that triggers a visible indication when attained. For example, when the build plate with the part(s) still attached go through post-processing thermal operations, such as stress relief, the thermal cycle limit causes the visual indicator to respond. This capability functions as a redundancy decoupled from the post-processing thermal operation furnace and will indicate the maximum temperature attained during the cycle. After the cycle is complete, the visual indicator retains its indication after cooling and serves as evidence of exposure to a particular temperature. The disclosed build plate thermal history indicator can function as a secondary, low cost system that helps establish confidence in an industrial-scale process and provides feedback on the post-processing furnace health. Having a secondary indicator of post-processing furnace health supports mistake-proofing in a production environment

Discussion of Possible Embodiments

The following are non-exclusive descriptions of possible embodiments of the present invention.

A powder bed fusion (PBF) additive manufacturing (AM) machine comprises a build plate configured to function as a platform to support one or more parts built using the PBF AM machine. The build plate further comprises a thermal history indicator positioned on the build plate, attached to the build plate, or physically integrated with the build plate such that the thermal history indicator experiences the same temperature as the build plate and the thermal history indicator is configured to display a durable visual indication of achievement of a temperature associated with a post-processing step performed after the one or more parts are built on the build platform.

The PBF AM machine of the preceding paragraph can optionally include, additionally and/or alternatively, any one or more of the following features, configurations and/or additional elements:

The PBF AM machine of any of the preceding paragraphs, comprising a plurality of thermal history indicators positioned on the build plate, attached to the build plate, or physically integrated with the build plate such that each of the plurality of thermal history indicators experiences the same temperature as the build plate and each of the plurality of history indicators is configured to display a durable visual indication of achievement of a different temperature associated with a post-processing step performed after the one or more parts are built on the build platform.

The PBF AM machine of any of the preceding paragraphs, wherein the post-processing step includes at least one of stress relief, hot isostatic pressing, and heat treatment.

The PBF AM machine of any of the preceding paragraphs, wherein the thermal history indicator comprises a thermocouple and a visual indicator, wherein the thermocouple is positioned on the build plate, attached to the build plate, or physically integrated with the build plate such that the thermocouple experiences the same temperature as the build plate and the thermocouple is configured to generate a threshold current when the thermocouple is exposed to the temperature associated with the post-processing step performed after the one or more parts are built on the build platform and wherein the visual indicator is configured to undergo an irreversible color change upon exposure to the threshold current received from the thermocouple.

The PBF AM machine of any of the preceding paragraphs, wherein the thermal history indicator comprises a shape memory alloy positioned on the build plate, attached to the build plate, or physically integrated with the build plate such that the shape memory alloy experiences the same temperature as the build plate and the shape memory alloy is configured to undergo a durable color change upon reaching the temperature associated with the post-processing step performed after the one or more parts.

The PBF AM machine of the preceding paragraph, wherein the shape memory allow comprises a copper-nickel-aluminum alloy.

The PBF AM machine of the preceding paragraph, wherein the thermal history indicator comprises a thermal growth material positioned on the build plate, attached to the build plate, or physically integrated with the build plate such that the thermal growth material experiences the same temperature as the build plate, wherein the thermal growth material undergoes a defined thermal expansion when exposed to the temperature associated with the post-processing step performed after the one or more parts are built on the build platform, further wherein as the thermal growth material undergoes thermal expansion the thermal growth material engages with a rack to cause a pinion mechanically connected to the rack to rotate to create a durable indication of thermal exposure of the build plate.

The PBF AM machine of the preceding paragraph, wherein the rack is a variable ratio rack configured to account for nonlinear coefficients of thermal expansion in the thermal growth material.

The PBF AM machine of any of the preceding paragraphs, wherein the thermal history indicator comprises a thermal growth material positioned on the build plate, attached to the build plate, or physically integrated with the build plate such that the thermal growth material experiences the same temperature as the build plate, wherein the thermal growth material is configured to undergo a defined thermal expansion when exposed to the temperature associated with the post-processing step performed after the one or more parts are built on the build platform, further wherein as the thermal growth material undergoes thermal expansion the thermal growth material engages a linear variable differential transformer (LVDT), which in turn generates a threshold current when the thermal growth material is exposed to the temperature associated with the post-processing step performed after the one or more parts are built on the build platform, and wherein a visual indicator is configured to undergo a durable color change upon exposure to the threshold current received from the LVDT.

The PBF AM machine of any of the preceding paragraphs, wherein the PBF AM machine is a laser PBF AM machine.

A method of operating a PBF AM machine comprising providing a build plate configured to function as a platform to support one or more parts built using the AM machine; and exposing the build plate and a thermal history indicator positioned on the build plate, attached to the build plate, or physically integrated with the build plate to elevated temperatures associated with a post-processing step performed after the one or more parts are built on the build platform such that the thermal history indicator displays a durable visual indication of achievement of a predetermined temperature associated with the post-processing step.

The method of the preceding paragraph can optionally include, additionally and/or alternatively, any one or more of the following features, configurations and/or additional elements:

The method of the preceding paragraph, wherein a plurality of thermal history indicators are positioned on the build plate, attached to the build plate, or physically integrated with the build plate such that each of the plurality of thermal history indicators experiences the same temperature as the build plate and each of the plurality of history indicators is configured to display a durable visual indication of achievement of a different temperature associated with a post-processing step performed after the one or more parts are built on the build platform.

The method of any of the preceding paragraphs, wherein the post-processing step includes at least one of stress relief, hot isostatic pressing, and heat treatment.

The method of any of the preceding paragraphs, wherein the thermal history indicator comprises a thermocouple and a visual indicator, wherein the thermocouple is positioned on the build plate, attached to the build plate, or physically integrated with the build plate such that the thermocouple experiences the same temperature as the build plate and the thermocouple is configured to generate a threshold current when the thermocouple is exposed to the temperature associated with the post-processing step performed after the one or more parts are built on the build platform and wherein the visual indicator is configured to undergo an irreversible color change upon exposure to the threshold current received from the thermocouple.

The method of any of the preceding paragraphs, wherein the thermal history indicator comprises a shape memory alloy positioned on the build plate, attached to the build plate, or physically integrated with the build plate such that the shape memory alloy experiences the same temperature as the build plate and the shape memory alloy is configured to undergo a durable color change upon reaching the temperature associated with the post-processing step performed after the one or more parts.

The method of any of the preceding paragraphs, wherein the shape memory allow comprises a copper-nickel-aluminum alloy.

The method of any of the preceding paragraphs, wherein the thermal history indicator comprises a thermal growth material positioned on the build plate, attached to the build plate, or physically integrated with the build plate such that the thermal growth material experiences the same temperature as the build plate, wherein the thermal growth material undergoes a defined thermal expansion when exposed to the temperature associated with the post-processing step performed after the one or more parts are built on the build platform, further wherein as the thermal growth material undergoes thermal expansion the thermal growth material engages with a rack to cause a pinion mechanically connected to the rack to rotate to create a durable indication of thermal exposure of the build plate.

The method of the preceding paragraph, wherein the rack is a variable ratio rack configured to account for nonlinear coefficients of thermal expansion in the thermal growth material.

The method of any of the preceding paragraphs, wherein the thermal history indicator comprises a thermal growth material positioned on the build plate, attached to the build plate, or physically integrated with the build plate such that the thermal growth material experiences the same temperature as the build plate, wherein the thermal growth material is configured to undergo a defined thermal expansion when exposed to the temperature associated with the post-processing step performed after the one or more parts are built on the build platform, further wherein as the thermal growth material undergoes thermal expansion the thermal growth material engages a linear variable differential transformer (LVDT), which in turn generates a threshold current when the thermal growth material is exposed to the temperature associated with the post-processing step performed after the one or more parts are built on the build platform, and wherein a visual indicator is configured to undergo a durable color change upon exposure to the threshold current received from the LVDT.

The method of any of the preceding paragraphs, wherein the PBF AM machine is a laser PBF AM machine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A powder bed fusion (PBF) additive manufacturing (AM) machine comprising:

a build plate configured to function as a platform to support one or more parts built using the PBF AM machine, wherein the build plate further comprises a thermal history indicator positioned on the build plate, attached to the build plate, or physically integrated with the build plate such that the thermal history indicator experiences the same temperature as the build plate and the thermal history indicator is configured to display a durable visual indication of achievement of a temperature associated with a post-processing step performed after the one or more parts are built on the build platform.

2. The PBF AM machine of claim 1, comprising a plurality of thermal history indicators positioned on the build plate, attached to the build plate, or physically integrated with the build plate such that each of the plurality of thermal history indicators experiences the same temperature as the build plate and each of the plurality of history indicators is configured to display a durable visual indication of achievement of a different temperature associated with a post-processing step performed after the one or more parts are built on the build platform.

3. The PBF AM machine of claim 1, wherein the post-processing step includes at least one of stress relief, hot isostatic pressing, and heat treatment.

4. The PBF AM machine of claim 1, wherein the thermal history indicator comprises a thermocouple and a visual indicator, wherein the thermocouple is positioned on the build plate, attached to the build plate, or physically integrated with the build plate such that the thermocouple experiences the same temperature as the build plate and the thermocouple is configured to generate a threshold current when the thermocouple is exposed to the temperature associated with the post-processing step performed after the one or more parts are built on the build platform and wherein the visual indicator is configured to undergo an irreversible color change upon exposure to the threshold current received from the thermocouple.

5. The PBF AM machine of claim 1, wherein the thermal history indicator comprises a shape memory alloy positioned on the build plate, attached to the build plate, or physically integrated with the build plate such that the shape memory alloy experiences the same temperature as the build plate and the shape memory alloy is configured to undergo a durable color change upon reaching the temperature associated with the post-processing step performed after the one or more parts.

6. The PBF AM machine of claim 5, wherein the shape memory alloy comprises a copper-nickel-aluminum alloy.

7. The PBF AM machine of claim 1, wherein the thermal history indicator comprises a thermal growth material positioned on the build plate, attached to the build plate, or physically integrated with the build plate such that the thermal growth material experiences the same temperature as the build plate, wherein the thermal growth material undergoes a defined thermal expansion when exposed to the temperature associated with the post-processing step performed after the one or more parts are built on the build platform, further wherein as the thermal growth material undergoes thermal expansion the thermal growth material engages with a rack to cause a pinion mechanically connected to the rack to rotate to create a durable indication of thermal exposure of the build plate.

8. The PBF AM machine of claim 7, wherein the rack is a variable ratio rack configured to account for nonlinear coefficients of thermal expansion in the thermal growth material.

9. The PBF AM machine of claim 1, wherein the thermal history indicator comprises a thermal growth material positioned on the build plate, attached to the build plate, or physically integrated with the build plate such that the thermal growth material experiences the same temperature as the build plate, wherein the thermal growth material is configured to undergo a defined thermal expansion when exposed to the temperature associated with the post-processing step performed after the one or more parts are built on the build platform, further wherein as the thermal growth material undergoes thermal expansion the thermal growth material engages a linear variable differential transformer (LVDT), which in turn generates a threshold current when the thermal growth material is exposed to the temperature associated with the post-processing step performed after the one or more parts are built on the build platform, and wherein a visual indicator is configured to undergo a durable color change upon exposure to the threshold current received from the LVDT.

10. The PBF AM machine of claim 1, wherein the PBF AM machine is a laser PBF AM machine.

11. A method of operating a powder bed fusion (PBF) additive manufacturing (AM) machine comprising:

providing a build plate configured to function as a platform to support one or more parts built using the AM machine; and exposing the build plate and a thermal history indicator positioned on the build plate, attached to the build plate, or physically integrated with the build plate to elevated temperatures associated with a post-processing step performed after the one or more parts are built on the build platform such that the thermal history indicator displays a durable visual indication of achievement of a predetermined temperature associated with the post-processing step.

12. The method of operating a PBF AM machine of claim 11, wherein a plurality of thermal history indicators are positioned on the build plate, attached to the build plate, or physically integrated with the build plate such that each of the plurality of thermal history indicators experiences the same temperature as the build plate and each of the plurality of history indicators is configured to display a durable visual indication of achievement of a different temperature associated with a post-processing step performed after the one or more parts are built on the build platform.

13. The method of operating a PBF AM machine of claim 11, wherein the post-processing step includes at least one of stress relief, hot isostatic pressing, and heat treatment.

14. The method of operating a PBF AM machine of claim 11, wherein the thermal history indicator comprises a thermocouple and a visual indicator, wherein the thermocouple is positioned on the build plate, attached to the build plate, or physically integrated with the build plate such that the thermocouple experiences the same temperature as the build plate and the thermocouple is configured to generate a threshold current when the thermocouple is exposed to the temperature associated with the post-processing step performed after the one or more parts are built on the build platform and wherein the visual indicator is configured to undergo an irreversible color change upon exposure to the threshold current received from the thermocouple.

15. The method of operating a PBF AM machine of claim 11, wherein the thermal history indicator comprises a shape memory alloy positioned on the build plate, attached to the build plate, or physically integrated with the build plate such that the shape memory alloy experiences the same temperature as the build plate and the shape memory alloy is configured to undergo a durable color change upon reaching the temperature associated with the post-processing step performed after the one or more parts.

16. The method of operating a PBF AM machine of claim 15, wherein the shape memory alloy comprises a copper-nickel-aluminum alloy.

17. The method of operating a PBF AM machine of claim 11, wherein the thermal history indicator comprises a thermal growth material positioned on the build plate, attached to the build plate, or physically integrated with the build plate such that the thermal growth material experiences the same temperature as the build plate, wherein the thermal growth material undergoes a defined thermal expansion when exposed to the temperature associated with the post-processing step performed after the one or more parts are built on the build platform, further wherein as the thermal growth material undergoes thermal expansion the thermal growth material engages with a rack to cause a pinion mechanically connected to the rack to rotate to create a durable indication of thermal exposure of the build plate.

18. The method of operating a PBF AM machine of claim 17, wherein the rack is a variable ratio rack configured to account for nonlinear coefficients of thermal expansion in the thermal growth material.

19. The method of operating a PBF AM machine of claim 11, wherein the thermal history indicator comprises a thermal growth material positioned on the build plate, attached to the build plate, or physically integrated with the build plate such that the thermal growth material experiences the same temperature as the build plate, wherein the thermal growth material is configured to undergo a defined thermal expansion when exposed to the temperature associated with the post-processing step performed after the one or more parts are built on the build platform, further wherein as the thermal growth material undergoes thermal expansion the thermal growth material engages a linear variable differential transformer (LVDT), which in turn generates a threshold current when the thermal growth material is exposed to the temperature associated with the post-processing step performed after the one or more parts are built on the build platform, and wherein a visual indicator is configured to undergo a durable color change upon exposure to the threshold current received from the LVDT.

20. The method of operating a PBF AM machine of claim 11, wherein the PBF AM machine is a laser PBF AM machine.

\* \* \* \* \*